United States Patent [19]

Schumacher

[11] Patent Number: 5,022,194
[45] Date of Patent: Jun. 11, 1991

[54] METHOD AND APPARATUS FOR FINISHING ELASTIC O-RING GASKETS

[75] Inventor: Frederick A. Schumacher, Wyckoff, N.J.

[73] Assignee: Glebar Company, Inc., Franklin Lakes, N.J.

[21] Appl. No.: 480,082

[22] Filed: Feb. 14, 1990

[51] Int. Cl.$^5$ .............................................. B24B 5/18
[52] U.S. Cl. .................................. 51/290; 51/103 TF
[58] Field of Search ............... 51/290, 236, 148, 289, 51/103 R, 103 TF, 105 R, 105 SP, 165.77, 201 R, 327

[56] References Cited

U.S. PATENT DOCUMENTS

| | | |
|---|---|---|
| 335,935 | 2/1886 | Kipper . |
| 2,231,556 | 2/1941 | Arpin . |
| 2,335,294 | 11/1943 | Meyer . |
| 3,467,742 | 9/1969 | Shobert . |
| 4,271,639 | 6/1981 | Talalay et al. . |
| 4,651,473 | 3/1987 | Zampini, Jr. ..................... 51/148 |

FOREIGN PATENT DOCUMENTS

| | | | |
|---|---|---|---|
| 0028069 | 8/1978 | Japan ................................. 51/326 |
| 0104736 | 6/1983 | Japan ................................. 51/290 |

Primary Examiner—M. Rachuba
Attorney, Agent, or Firm—Fitzpatrick, Cella, Harper & Scinto

[57] ABSTRACT

A method and apparatus for finishing an endless length of feed stock to form a uniform circular cross-section. A dished surface, set back from and into the surface of the regulator wheel, causes the stock to rotate about its longitudinal axis as it is advanced around the regulator wheel and in contact with an abrasive surface.

32 Claims, 5 Drawing Sheets

METHOD AND APPARATUS FOR FINISHING ELASTIC O-RING GASKETS

BACKGROUND OF THE INVENTION

1. Field of the Invention

This invention relates to a method for finishing elastic O-ring gaskets to extremely close tolerances and to apparatus for performing that method. More particularly, the invention relates to a method of presenting an unfinished, endless length of elastic O-ring feed stock to the grinding surface of a centerless grinder and to apparatus for effecting such presentation and grinding the feed stock to a finished condition.

2. Description of the Prior Art

One conventional method of manufacturing elastic packing rings or O-ring gaskets of generally circular cross section, involves the extrusion of a moldable plastic rubber compound to form a preform rod of suitable cross section, and thereafter cutting the rod to length and inserting it into a mold in which a fused joint is developed between abutting rod ends during heat cure. It has been found that producing O-rings by this method frequently results in weak joints at which failures occur.

Another conventional method of making O-rings is to die-cut a circular preform ring from a calendared flat sheet of stock, and to then mold and cure the preform to final O-ring shape and dimension. O-rings produced by this latter method have no mold fused joint, but they are defective as to strength because the grain of the stock is not uniform throughout the ring, but on the contrary parallels the walls on two sides and is transverse thereto on the other two sides.

It has also long been known to fabricate O-ring gaskets to finished condition by a molding process intended to overcome the above defect. Thus, U.S. Pat. No. 2,646,595 discloses a method wherein a jointless, cylindrical preform is cut into rings which are then shaped, pressure molded and heat cured to final dimensions.

U.S. Pat. No. 2,954,263 teaches a method of simultaneously forming a plurality of elastic O-rings suitable for use as sealing members wherein a moldable plastic mixture is calendared and circumferentially lapped and compressed on an undulated mandrel to form a jointless, tubular preform with an undulated inner surface on the mandrel. The preform is pressure molded and heat cured in an undulated die to form an undulated outer surface on the preform to complement its inner surface thus to define a plurality of O-rings of final shape and dimension on the mandrel. The O-ring forms, bonded together at their sides, are pulled apart.

Techniques and apparatus for forming endless belts are disclosed in U.S. Pat. Nos. 1,917,548, 2,588,647, 3,891,405 and 4,782,575. From these it is known to build a belt preform on a mandrel, for example, and then to grind or cut the preform to the desired shape.

SUMMARY OF THE INVENTION

In view of the precise tolerances required in O-rings today, I have found that known techniques are not adequate and that frequently surface irregularities such as flats, uneven butt or lap seams, etc. are present as are non-uniform circumferences. Thus, rings having more precisely defined surface configurations than those heretofore available are commercially desireable.

Accordingly, I have conceived and contribute by the present invention, a method and apparatus by which I am able to provide elastic rings, such as O-rings, which overcome the foregoing difficulties and disadvantages and the surfaces of which are dressed to fine tolerances as presently required, and regardless of the manner in which the ring stock was formed or of irregularities in its surface characteristics.

For attaining the objectives mentioned above and later to be expressed, an important aspect of the present inventive concept resides in the provision of apparatus for finishing an annular product to uniform circular cross-section from an endless length of feed stock, comprising grinding means formed with a grinding surface for grinding the endless length of feed stock, means for driving the grinding surface at a predetermined speed, means including a pair of regulators for supporting the endless length of feed stock, for urging the endless length of feed stock against the grinding surface while advancing it lengthwise at a predetermined speed and means for maintaining a predetermined tension on the feed stock.

The grinding surface may be the surface of a grinding wheel. The regulators may be configured in a manner later to be described and may be driven to advance the feed stock lengthwise, that is, along its longitudinal axis.

Means are also provided to rotate the feed stock about its longitudinal axis and, to this end, I support the regulators spaced from one another and I reeve the feed stock about the two regulators in such a manner that the endless length of feed stock is disposed in a FIG. 8 configuration. Henceforth the second regulator wheel will be referred to as one of the regulators or as the remote regulator.

The present concept includes a method of finishing an annular product to uniform circular cross-section from an endless length of feed stock. According to this method, the grinding wheel is rotated about its central axis, the feed stock is urged toward the grinding wheel while being advanced lengthwise in a predetermined direction relative to the direction of rotation of the grinding wheel to bring the advancing feed stock into contact with the grinding wheel and the feed stock is rotated about its longitudinal axis while it is being so advanced.

More specific details of various preferred features of the apparatus and method will be set forth hereinafter.

There has thus been outlined rather broadly the more important features of the invention in order that the detailed description thereof that follows may be better understood, and in order that the present contribution to the art may be better appreciated. There are, of course additional features of the invention that will be described hereinafter and which will form the subject of the claims appended hereto. Those skilled in the art will appreciate that the conception upon which this disclosure is based may readily be utilized as a basis for the realization of other structures or methods for carrying out the several purposes of the invention. It is important, therefore, that the claims be regarded as including such equivalent constructions and methods as do not depart from the spirit and scope of the invention.

DESCRIPTION OF THE DRAWINGS

Specific embodiments of the invention have been chosen for purposes of illustration and description, and are shown in the accompanying drawing, forming a part of the specification wherein.

Fits. 4, 5 and 6 are fragmentary, schematic views illustrating sequential dispositions and configurations of the feed stock during grinding.

DESCRIPTION OF THE PREFERRED EMBODIMENT

Figures 1, 2, 3:
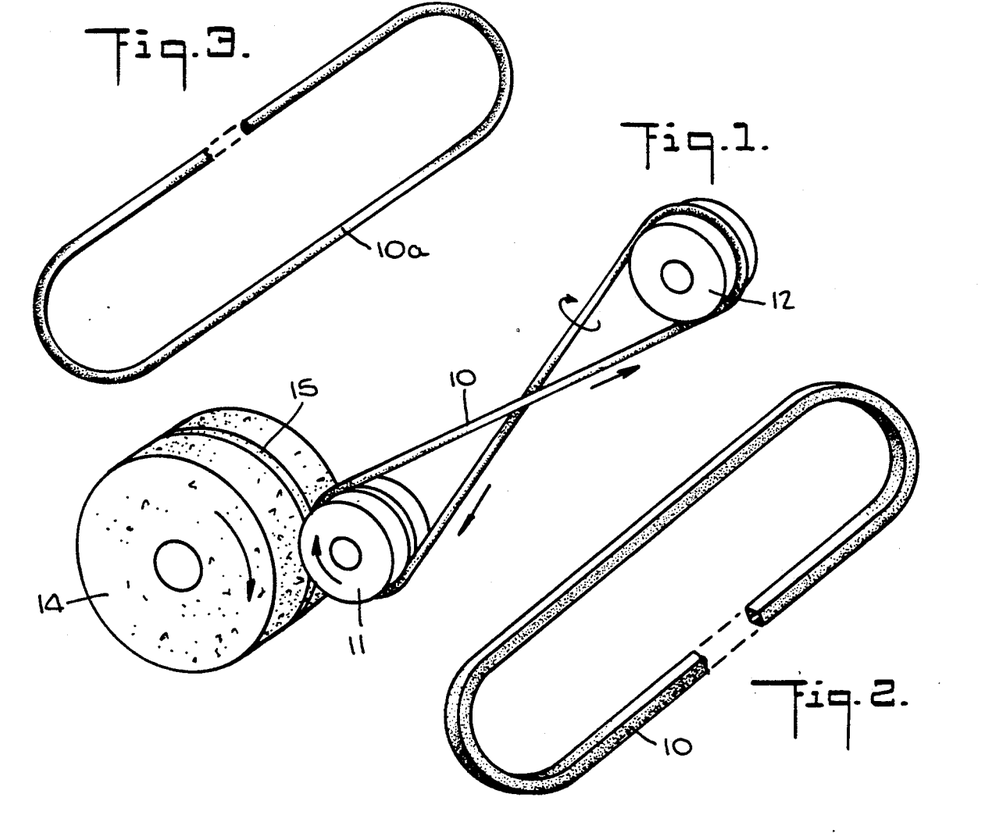
FIG. 1 is a schematic, perspective view illustrating an advancing and rotating endless length of feed stock reeved about a regulator and idler wheels while urged against a grooved grinding wheel.
FIG. 2 is a perspective view of an endless length of feed stock broken to show its cross-sectional configuration.
FIG. 3 is a view similar to FIG. 2 but showing a finished O-ring formed from the feed stock of FIG. 2.

Referring now to the drawing, and particularly to FIG. 1 thereof, there is shown an endless length of feed stock 10 reeved, in FIG.—8 configuration, about a regulator wheel 11 and a remote regulator 12. By reason of this arrangement, rotation of the regulators 11 and 12 in the arrow directions causes the feed stock 10 to advance lengthwise at a regulated speed, as indicated by the related straight arrows, and to rotate about its longitudinal axis, as shown by the related curved arrow. Appropriate means which will later be described, shift the above described elements in a direction to urge the feed stock against the surface of the grinding wheel 14 which may be formed with a groove 15 to receive the same and which is rotated as indicated by its related arrow.

As shown in FIG. 2, the feed stock 10 may be square or the like in cross-section, having been cut from a cylinder of feed stock material of appropriate diameter. However, it should be understood that endless lengths of feed stock formed of any known method and having various cross-sectional shapes may be employed in the present system.

FIG. 3 illustrates a completed product 10a having been finished by the arrangement schematically illustrated in FIG. 1, to a uniform, precisely dimensioned, circular cross-section.

Figure 4:
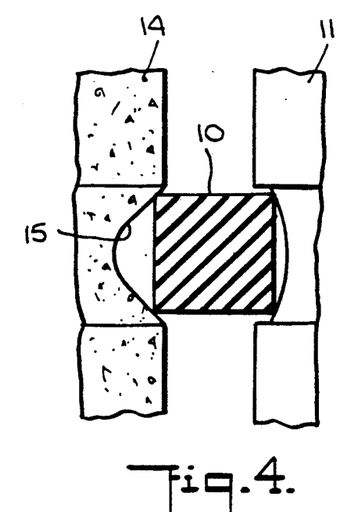
Figures 5, 6:
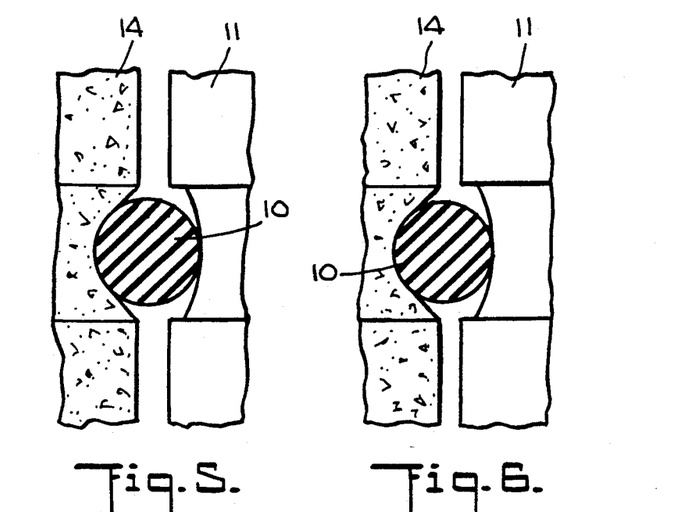

FIGS. 4 to 6 illustrate, respectively, a section of feed stock 10 of square cross-section for example, as it rotates under the influence of the rotating regulators 11 and 12 and is urged thereby to contact the grinding wheel 14 shown grooved as at 15. The grinding action gradually reforms the feed stock cross-section as shown in FIG. 5 as the regulators 11 and 12 continue to approach the grinding wheel 14 until, as shown in FIG. 6, the regulator wheels have completed their linear excursion and the process is completed.

In the arrangement shown in FIGS. 4 to 6, I have illustrated a grinding wheel 14 grooved at 15 although I have successfully finished commercially desirable O-rings using smooth, ungrooved grinding wheels. I have found though that grooves add to lateral stability of the rings during finishing and therefore are more convenient especially where a plurality of rings are being finished simultaneously.

Figure 7:
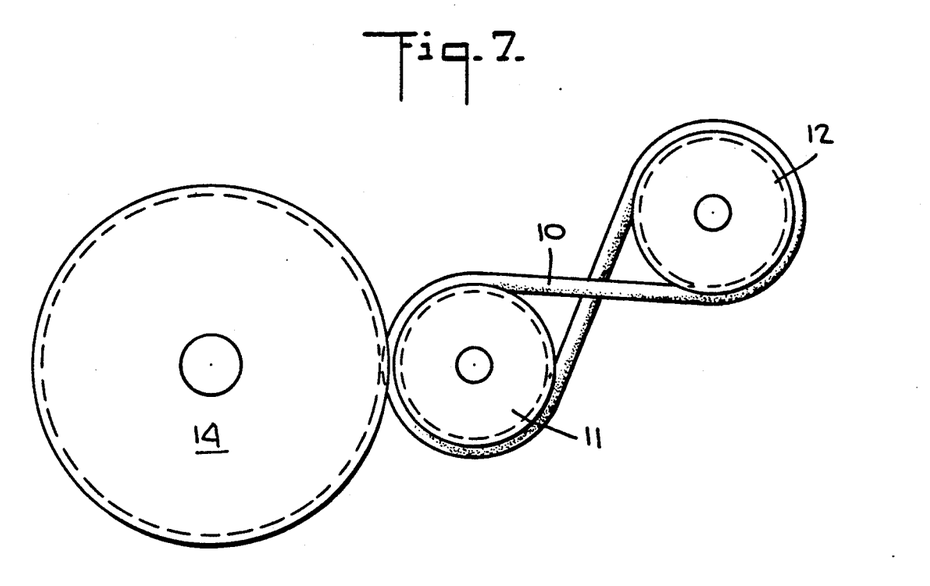
FIGS. 7 and 8 are, respectively, an elevational view and a plan view illustrating an arrangement similar to that of FIG. 1 but adapted simultaneously to grind multiple lengths of feed stock utilizing a grooved grinding wheel.
Figure 8:
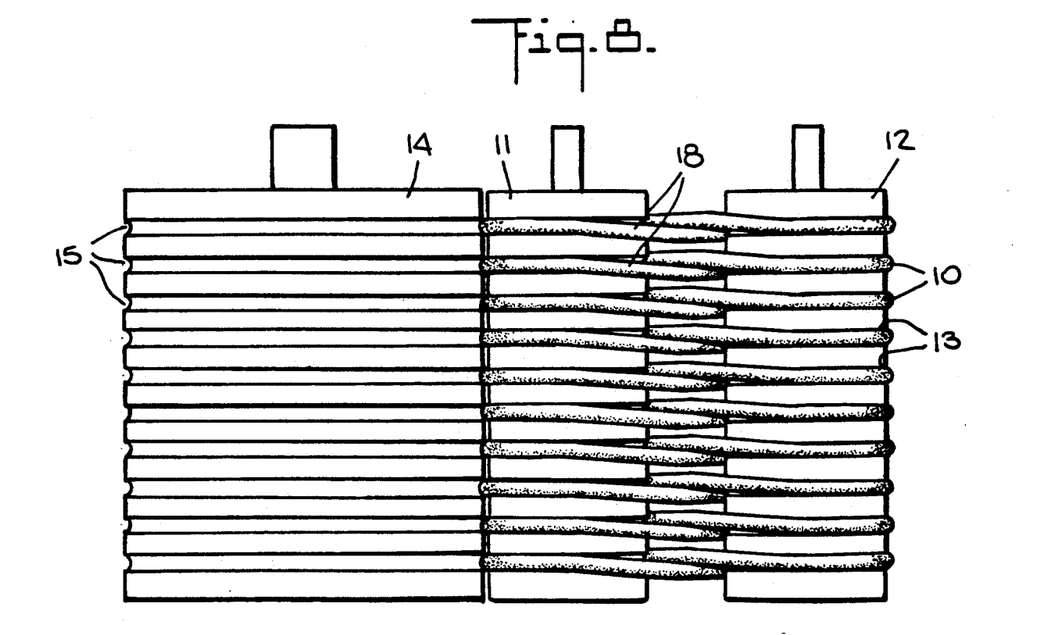

The arrangement illustrated in FIGS. 7 and 8 is similar to that described above except that here, the respective wheels 11, 12 and 14 are adapted for the simultaneous grinding of multiple endless lengths of feed stock 10, ten such lengths being shown. The remote regulator 12 and grinding wheel 14, as here shown, are each formed with ten opposing grooves 13 and 15, respectively, while the regulator wheel 11 has 10 dished portions 18 respectively aligned with the grooves 13 and 15. In this case I have illustrated an arrangement in which I grind 10 O-rings of round feed stock 10 it being noted that each length of feed stock is reeved in FIG. 8-configuration around the regulator wheel 11 and the remote regulator 12.

Those skilled in the art will understand that, where grooved grinding wheels are used, the grooves will be formed to a depth that will depend on the cross-sectional diameter of the feed stock being finished. I prefer to form the apex of the grooves on a suitable blend radius merging with tangents entering the wheel at an angle of about 30° to 50° and preferably at about 45° to its surface. Meanwhile, the surface of the regulator wheel 11 may also be smooth and ungrooved, but I have found that I obtain best results if I form a rectangular recess in the surface of that wheel 11 to a depth of about 1/32 in. and then dish the inner surface of that recess on a radius of the order of 0.875 in. The surface of the remote regulator may be similarly shaped.

Figure 9:
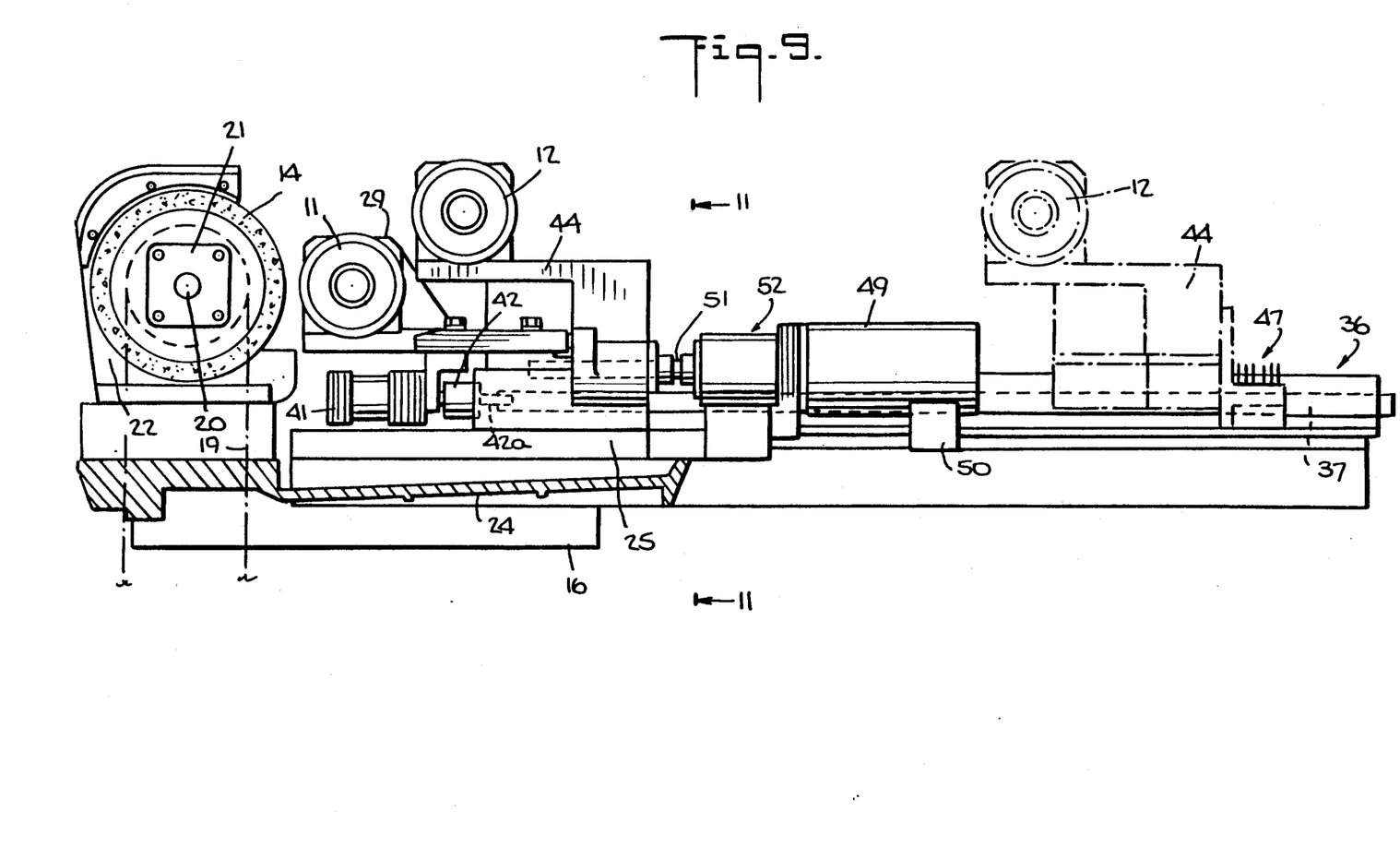
FIG. 9 is a side elevational view of the structure according to my invention.
Figure 10:
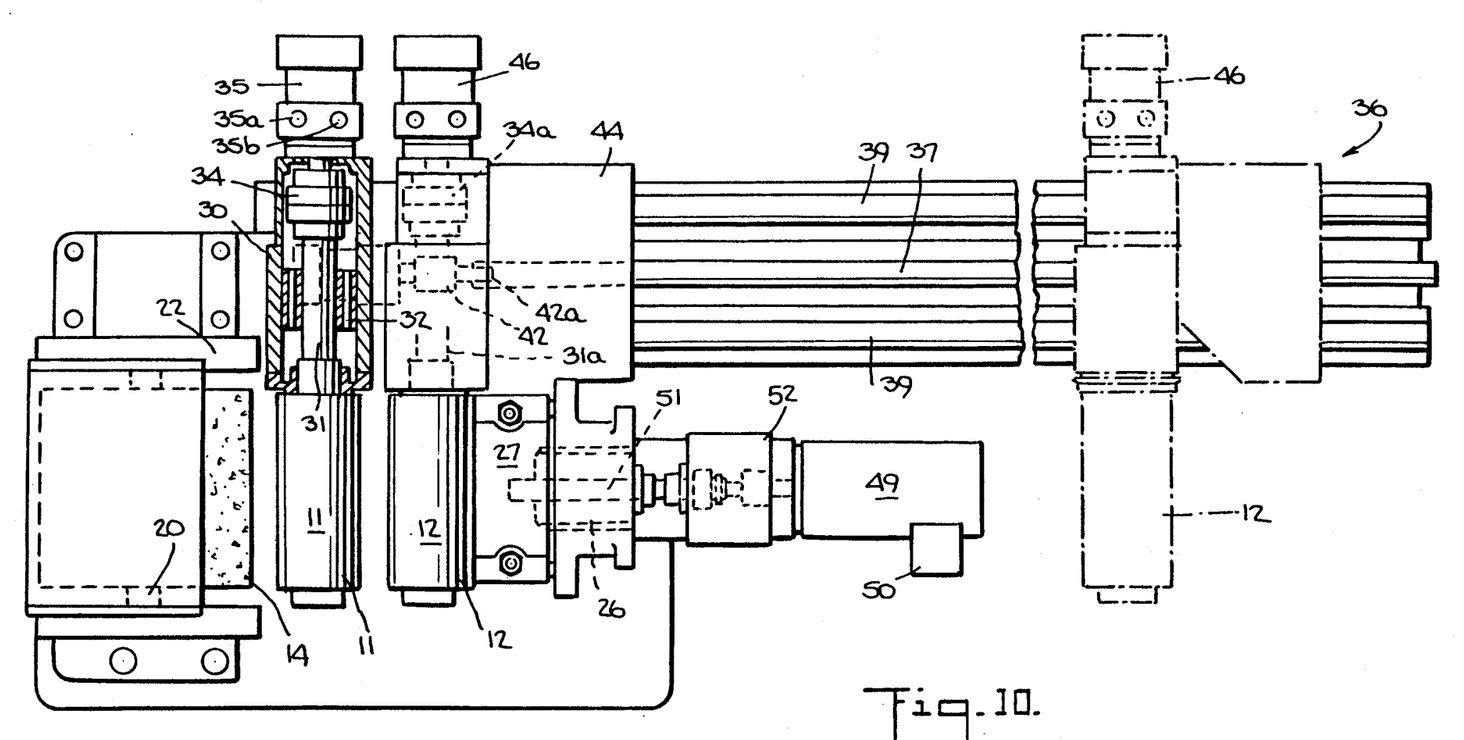
FIG. 10 is a plan view, partly in cross-section and partly broken away, of apparatus illustrating an embodiment of the present invention.
Figure 11:
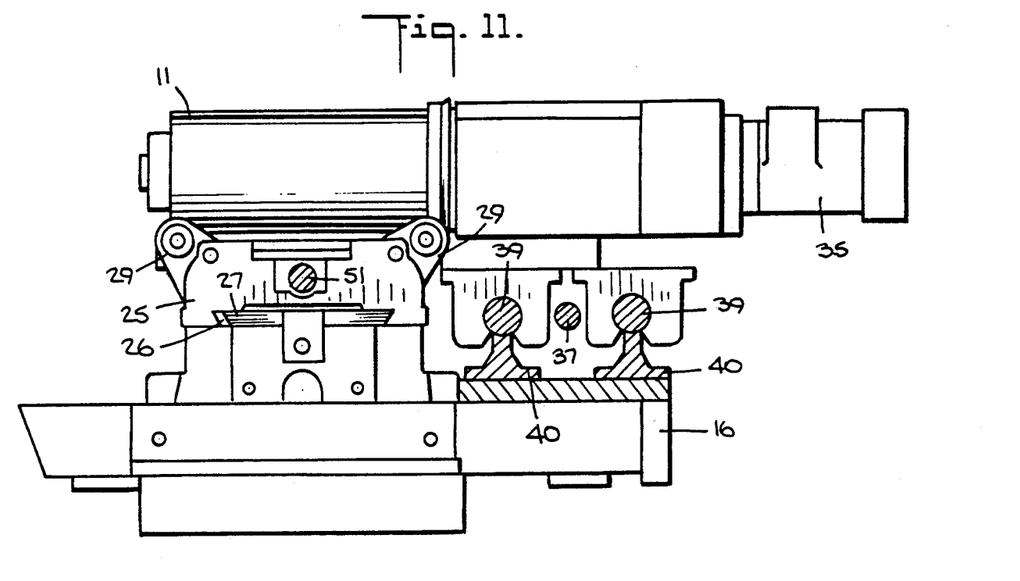
FIG. 11 is a cross-sectional view taken along the line 11—11 of FIG. 9.

Turning now to FIGS. 9 to 11 it will be seen that the apparatus of the present invention includes a supporting frame 16 housing a motor (not shown) that drives the grinding wheel 14 through belt 19. The wheel 14 is equipped with an axial shaft 20 each end of which is mounted for rotation in an appropriate bearing 21, only one of which is shown in FIG. 9, supported by upstanding flanges 22 bolted to the frame 16, as seen in FIG. 10.

Figure 12:
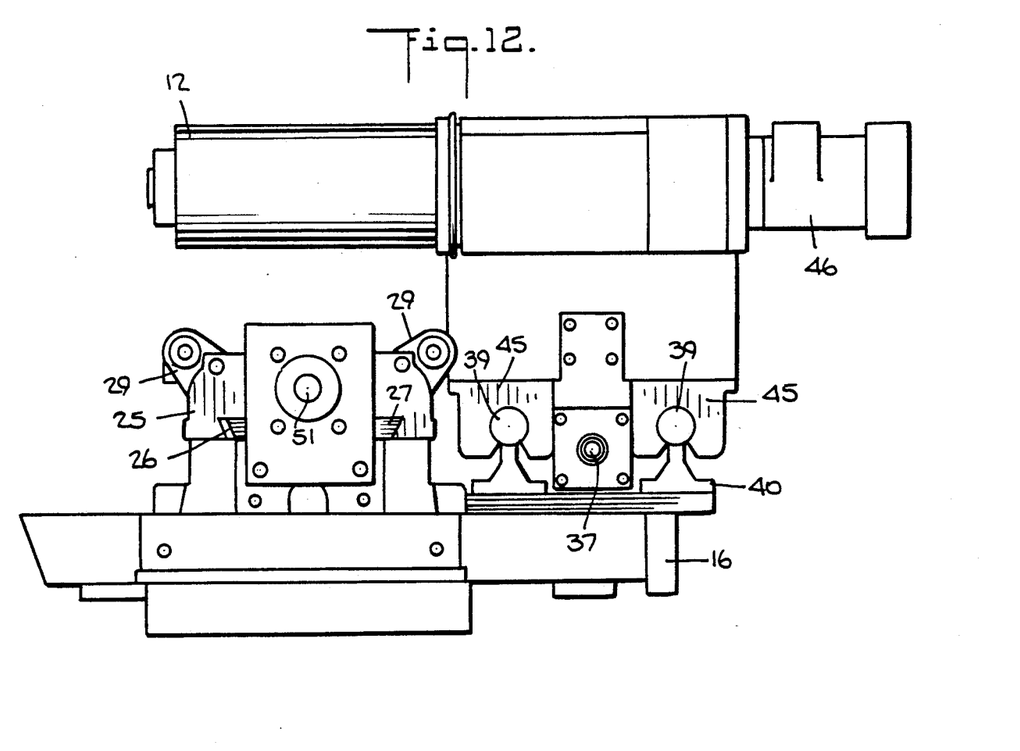
FIG. 12 is an end elevational view of the apparatus.

The frame also supports, as part of the machine bed, a portion 24 inclined downwardly to the left as viewed in FIG. 9, and immediately above the bed portion 24 I provide a solid rest 25 bolted to the frame as shown in FIGS. 9 and 10 and formed with a dovetail recess as at 26 (FIGS. 11 and 12) to guide lineal movement of a mating slide block 27. This block 27 carries upstanding flanges 29 which in turn support a housing 30 enclosing the drive shaft 31 for the regulator wheel 11, roller bearing 32, shown in FIG. 10, and coupling 34. Rotary power is transmitted to the wheel 11 through the coupling 34 and shaft 31 from a hydraulic drive 35 carried externally of the housing 30 and having hydraulic fluid inlet and outlet ports 35a and 35b, respectively.

With continuing reference to FIGS. 9 to 11, it will be recalled that the feed stock is to be reeved about both regulators 11 and 12 and of course comes in a variety of lengths; rings of a diameter of six feet have been dressed with the equipment and according to the procedure here described. In any case, it will be appreciated that the distance between regulators must be adjustable. To this end, I provide a conventional Thompson drive 36, manufactured by Thompson Industries of Port Washington, N.Y., which I secure to the slide block 27 in any convenient manner and which includes an elongate, cylindrical shaft 37 extending between a pair of parallel elongate rails 39 suitably supported by rail mounts 40 on an extension of frame 16. The left end of the shaft 37, as best seen in FIGS. 9 and 10 is connected to a hydraulic motor 41 through a flexible coupling 42 having a threaded stub shaft 42a projecting a slight distance into a threaded central bore at the end of the shaft 37.

The remote regulator 12 is mounted atop a platform 44 equipped with spaced, depending slides 45 that engage the rails 39 for sliding movement therealong and a hydraulic motor 46 similar to motor 35 is provided, along with shaft 31a and coupling 34a, to drive the remote regulator 12. Thus it will be seen that both the regulators 11 and 12 are driven and this is done in order to assure precise control of starting, running and stopping of the longitudinal movement of the feed stock. I prefer to drive the hydraulic motors 35 and 46 in series, that is, by passing the same hydraulic drive fluid through both motors in sequence.

To mount an O-ring on the regulators in preparation for dressing, the ring is reeved about the regulators in FIG.—8 configuration and the platform 44 carrying the remote regulator 12 is manually shifted along the shaft 37 until slack in the ring is taken up. The platform 44 is then clamped to the shaft 37 by suitable clamps illustrated schematically at 47 in FIG. 9, and the hydraulic motor 41 is activated to drive the stub shaft 42a relative to the shaft 37 thrusting that shaft, and consequently the platform 44 and the remote regulator 12 to apply and hold a precise predetermined tension on the O-ring.

The frame also carries a stepper motor 49 which may be provided with an encoder 50 and which drives a ball screw 51 through a thrust bearing 52. The ball screw threadedly engages the slide block 27 so that rotation of the stepper motor 49 causes that block, the attached regulator 11, the Thompson drive 36 and the regulator 12, to advance toward or retract from the grinding wheel 14 in discrete, intermittent steps. By this arrangement, I am able to move the feed stock against the grinding wheel and hold it in position for grinding until the stock has been longitudinally advanced a full length or a whole multiple of its length before the next increment of movement toward the wheel 14 is effected by the stepper motor 49 thus assuring uniform treatment of the stock.

From the description thus far, it will be appreciated that the grinding and regulator wheels are rotated simultaneously about axes which I prefer be parallel and that the regulators 11 and 12 are advanced in intermittent steps toward the grinding wheel while carrying an endless length of feed stock toward the grinding wheel which, upon contact with the feed stock, grinds it to a uniform and precise finish.

While satisfactory results have been realized by employing a hydraulic drive to move the feed stock at a predetermined, constant speed in a direction toward the grinding wheel, I prefer to use the stepper motor 49 intermittently to advance the regulators carrying the feed stock because, by programming its encoder, I can control the time periods between steps to be sure that, in the interest of precise uniformity, a full length of the feed stock, or a multiple thereof, is ground between each step. In this connection, I am able to monitor the progress of the work as it occurs by using a laser micrometer manufactured by Techmet Co. of Dayton, Ohio. In fact this device, which monitors the finish applied to the feed stock on the fly, can be used to control the stepper motor 49 through its encoder 50.

It will be appreciated that various grinding or finishing conditions may be required depending upon the nature of the feed stock but I have found that I am able to obtain excellent results for all of the applications that I have attempted if I employ a grinding surface of material such as aluminum oxide or silicon carbide, for example, defining a wheel 9 inches in diameter with regulator wheels of 4 inches in diameter, the grinding wheel being rotated at substantially 2750 RPM and the regulator wheel at between substantially 200 and 450 RPM and preferably about 300 RPM.

It will be seen that the mounting arrangement of the remote regulator 12 as here described, permits a large variety of precisely set positions at which the same may accommodate O-rings of any size under precise tension for optimum performance. I also achieve a high degree of uniformity in the surface of the dressed stock by using the stepper motor to advance both regulators toward the grinding wheel thus to maintain uniform tension on the feed stock throughout the process. I may, of course, trickle a coolant such as water over the contacting surfaces of the grinding wheel and the feed stock.

I believe that the construction and operation of my novel apparatus and method will now be understood and that the several advantages thereof will be fully appreciated by those persons skilled in the art.

What is claimed:

1. Apparatus for finishing an endless length of feed stock to uniform circular cross-section, comprising:
   grinding means formed with a grinding surface for grinding the endless length of feed stock;
   means for driving said grinding surface at a predetermined speed;
   means for supporting the endless length of feed stock in FIG.—8 configuration; and
   means for shifting one of said grinding means and said supporting means toward the other to urge the endless length of feed stock against said grinding surface, said shifting means acting in discrete increments of movement so that at least a full length of the feed stock is ground between each movement;
   whereby the feed stock is rotated about its longitudinal axis while it is being so advanced.

2. Apparatus according to claim 1, wherein said supporting means include a regulator wheel and a remote regulator and means for driving said regulator wheel and said remote regulator.

3. Apparatus according to claim 3, further comprising means for adjusting the position of said remote regulator relative to said regulator wheel so that the same may accommodate feed stock of a variety of lengths.

4. Apparatus according to claim 3, wherein said urging means includes means for moving said regulator wheel and said remote regulator toward said grinding wheel.

5. Apparatus according to claim 3, wherein said adjusting means include a shaft, means mounting said remote regulator for sliding movement along said shaft and means for clamping said remote regulator to said shaft at a predetermined position relative to the position of said regulator wheel.

6. Apparatus according to claim 5, further including means for adjusting the position of said shaft and remote regulator relative to said regulator wheel while the feed stock is supported thereby to apply a predetermined tension to the feed stock.

7. Apparatus for finishing an endless length of feed stock to uniform circular cross-section, comprising:
   means formed with a grinding surface for grinding the endless length of feed stock;
   means for rotating said grinding surface at a predetermined speed;

a regulator wheel and a remote regulator each having a surface for engaging a portion of the endless length of feed stock;

means for urging said regulator wheel and said remote regulator simultaneously toward said grinding surface to bring the portion of the feed stock engaging the same against said grinding surface; and means for rotating said regulator wheel and said remote regulator about respective axes substantially parallel to but offset at an angle from the axis of rotation of said grinding surface to advance the length of feed stock lengthwise;

whereby the feed stock is rotated about its longitudinal axis while it is being so advanced.

8. Apparatus according to claim 7 wherein said urging means includes means for moving said regulator wheel toward said grinding wheel in discrete, timed increments so that at least a full length of the feed stock is ground between each movement.

9. Apparatus according to claims 7 or 8, wherein said urging means is a stepper motor.

10. Apparatus according to claim 7, wherein said grinding surface is defined by a wheel having a 9 inch diameter, said regulator wheel has a 4 inch diameter and said grinding wheel and said regulator wheel are rotated at substantially 2750 RPM and between substantially 200 and 450 RPM, respectively, 11. Apparatus according to claim 10, wherein said regulator wheel is rotated at substantially 300 RPM.

12. Apparatus according to claim 11, wherein the surface of said regulator wheel engaged by the feed stock is dished.

13. Apparatus according to claim 12 wherein said dished surface is formed on a radius of the order of 0.875 inches.

14. Apparatus according to claims 13, wherein said dished surface depends from a level recessed of the order of 1/32 in from the outer surfaces of said regulator wheel.

15. Apparatus for finishing an endless length of feed stock to uniform circular cross-section, comprising:

grinding means formed with a grinding surface for grinding the endless length of feed stock;

a regulator and a remote regulator for supporting the endless length of feed stock, said regulator having a dished surface set back a distance from the surface of said regulator.

means for urging the regulator and the remote regulator toward said grinding means to bring a portion of said feed stock against said grinding surface; and means for rotating said regulators to advance the feed stock lengthwise at predetermined speed;

whereby the feed stock is rotated about its longitudinal axis while it is being so advanced.

16. Apparatus according to claim 15, further including means for establishing and maintaining a predetermined tension in the feed stock.

17. Apparatus according to claim 15, further including means including a cylinder for shifting one of said regulator and said remote regulator relative to the other to apply and maintain a predetermined tension in feed stock reeved around said regulators.

18. Apparatus according to claim 15, 16, or 17, wherein said urging means is a stepper motor and one of said regulators is linearly movable relative to the other along an elongated shaft and is adapted to be fixed to the shaft at a predetermined position, said regulators and shaft being movable by said stepper motor toward said grinding means to bring the surface of the feed stock against grinding surface.

19. Apparatus according to claim 15, wherein said grinding surface is formed with a groove whose sides depend from said grinding surface at an angle in the range of the order of 30 to 50 degrees and the apex of said groove is radiused and merges with said sides.

20. Apparatus according to claim 19, wherein the sides of said groove depend from said peripheral surface at an angle of the order of 45 degrees.

21. Apparatus according to claim 15, wherein said recessed dished surface is formed on a radius of the order of 0.875 inches.

22. Apparatus according to claim 21, wherein said dished surface is set back on the order of 1/32 in. from the outer surfaces of said regulator.

23. A method of finishing an annular product to uniform cross-section comprising the steps of:

reeving an endless length of feed stock about a regulator wheel and a remote regulator spaced therefrom in a manner to dispose the length of feed stock in a FIG.—8 configuration;

providing a grinding wheel spaced from said regulator wheel;

rotating said regulator wheel and said remote regulator to advance said feed stock lengthwise;

rotating said grinding wheel about an axis parallel to the axis of said regulator wheel;

urging said regulator wheel and said remote regulator toward said grinding wheel to cause said feed stock to engage the surface of said grinding wheel while said feed stock is so advanced; and through interaction at the grinding wheel and the regulator wheel, rotating said feed stock about its longitudinal axis and continuing said longitudinal rotation at least until said feed stock has been finished into a substantially circular cross-section.

24. A method according to claim 23, including the step of forming a groove in the surface of said grinding wheel whereby when said regulator wheel and remote regulator are urged toward said grinding wheel, the advancing length of feed stock enters said groove and is ground by contact with its surface.

25. A method according to claim 23, including the step of adjusting the lineal distance between said regulator and remote regulator when the feed stock is reeved therearound and for then shifting one of said regulators relative to the other to apply and maintain a predetermined tension on the length of feed stock while it is being finished.

26. A method of finishing an annular product to uniform cross-section comprising the steps of:

reeving an endless length of feed stock about a regulator wheel and a remote regulator spaced therefrom;

providing a grinding wheel spaced from said regulator wheel;

rotating said regulator wheel and said remote regulator to advance said feed stock lengthwise;

rotating said grinding wheel in a predetermined annular direction relative to the direction of advance of the feed stock;

urging said regulator wheel and said remote regulator toward said grinding wheel in intermittent steps to cause the feed stock to move in a direction toward and to engage the surface of said grinding wheel while the feed stock is so advanced; and causing the feed stock to rotate about its longitudinal axis while it is being so urged.

27. A method according to claim 26, and further timing said steps so that the same are separated by discrete periods to permit the entire length of the advancing feed stock to engage the surface of said grinding wheel at least once during each discrete period.

28. A method according to claim 26 or 27, including the step of reeving the endless length of feed stock about said regulator and remote regulator in a manner to dispose the length of feed stock in a FIG.—8 configuration.

29. A method according to claim 26 or 27, including the step of forming a groove in the surface of said grinding wheel whereby when said regulator wheel and remote regulator are urged toward said grinding wheel, the advancing length of feed stock enters said groove and is ground by contact with its surface.

30. A method according to claim 28, including the step of forming a groove in the surface of said grinding wheel whereby when said regulator wheel and remote regulator are urged toward said grinding wheel, the advancing length of feed stock enters said groove and is ground by contact with its surface.

31. A method according to claim 23 or 26, wherein in said rotating steps, said regulator wheel and said remote regulator are rotated about axes parallel to but offset at an angle from the axis of said grinding wheel.

32. A method according to claim 23 or 26, including the step of providing said regulator wheel with a recessed dished surface for receiving the annular product.

* * * * *

UNITED STATES PATENT AND TRADEMARK OFFICE
CERTIFICATE OF CORRECTION

PATENT NO. : 5,022,194
DATED : June 11, 1991
INVENTOR(S) : Frederick A. Schumacher It is certified that error appears in the above-indentified patent and that said Letters Patent is hereby corrected as shown below:

COLUMN 2

Line 28, "FIG. 8" should read --figure-8--.

COLUMN 3

Line 29, "FIG.—8" should read --figure-8--.

COLUMN 4

Line 14, "FIG." should read --figure- --.

COLUMN 5

Line 17, "FIG.—8" should read --figure-8--.

COLUMN 6

Line 31, "FIG.—8" should read --figure-8--.
Line 44, "claim 3," should read --claim 2,--.

COLUMN 7

Line 48, "regulator." should read --regulator;--.

UNITED STATES PATENT AND TRADEMARK OFFICE
CERTIFICATE OF CORRECTION

PATENT NO. : 5,022,194
DATED : June 11, 1991
INVENTOR(S) : Frederick A. Schumacher It is certified that error appears in the above-indentified patent and that said Letters Patent is hereby corrected as shown below:

COLUMN 8

Line 23, "FIG.—8" should read --figure-8--.

COLUMN 9

Line 13, "FIG.—8" should read --figure-8--.

Signed and Sealed this

Twentieth Day of June, 1995

*Attest:*

BRUCE LEHMAN

*Attesting Officer*   *Commissioner of Patents and Trademarks*